United States Patent [19]

Berger

[11] 4,449,940

[45] May 22, 1984

[54] SIMULATOR FOR WIND SURFING

[76] Inventor: Pierre L. Berger, 83310 Cogolin, La Mole, France

[21] Appl. No.: 319,393

[22] Filed: Nov. 9, 1981

[30] Foreign Application Priority Data

Nov. 12, 1980 [FR] France ................................ 80 24009

[51] Int. Cl.³ .............................................. G09B 9/06
[52] U.S. Cl. ...................................................... 434/66
[58] Field of Search .......................................... 434/60

[56] References Cited

U.S. PATENT DOCUMENTS 2,208,083 7/1940 Rousseau ............................. 434/60
3,940,862 3/1976 Nishimura ............................ 434/60
4,021,934 5/1977 Taylor ................................... 434/60

FOREIGN PATENT DOCUMENTS 7610183 9/1976 Fed. Rep. of Germany .
2541106 3/1977 Fed. Rep. of Germany .
2941839 4/1981 Fed. Rep. of Germany .
1500889 7/1966 France .
1566239 1/1968 France .
2365356 4/1978 France .
2504710 10/1982 France .

Primary Examiner—William H. Grieb
Attorney, Agent, or Firm—Sandler & Greenblum

[57] ABSTRACT

The present invention relates to a simulator for wind surfing which includes a webbed foundation, a wind surfer support, a pivot for allowing the support to pivot in relation to the foundation, and a brake for restricting the pivoting motion of the support.

13 Claims, 15 Drawing Figures

SIMULATOR FOR WIND SURFING

BACKGROUND OF THE INVENTION

1. Field of the Invention

The present invention generally relates to simulators for wind surfing and specifically to apparatus intended to teach wind surfing maneuvers to beginners.

2. Discussion of Prior Art

The sport of wind surfing is developing rapidly and is attracting a large number of participants. Several apparatus which allow one to learn to maneuver wind surfers already exist. These known apparatus are not completely suitable as they are generally made on a very small scale, and in particular because they do not simulate all of the conditions necessary to accurately teach beginners the use of a wind surfer. Thus it was necessary, especially for wind surfing training schools, to perfect an apparatus which allows one to practice wind surfing on dry land, additionally allowing the apparatus to simulate as closely as possible all of the possible movements of a wind surfer when it is in its natural element, i.e., water, and when it is subject to natural wind conditions.

Also, the present invention has as a goal production of a simulator for wind surfing which facilitates and improves initiation, technique, and land training under conditions comparable to those found on the ocean.

SUMMARY OF THE INVENTION

More specifically, the present invention has as its object a simulator for wind surfing comprising a support infrastructure on the ground, a support for a wind surfer able to cooperate with the support infrastructure for longitudinal and transverse oscillating movements, means allowing the support to pivot in relation to the structure, means for breaking rotation of the support, and means for positioning and centering the wind surfer on the support.

According to another characteristic of the invention, the infrastructure is comprised of a foundation having one or more elements which are preferably webbed.

According to another characteristic of the invention the foundation comprises an assembly of identical elements.

According to yet another characteristic of the invention, the identical foundation elements are connected by a centering return ring which cooperates with each of the elements.

According to another characteristic of the invention, the braking means comprise a friction creating device connected to the support and capable of cooperating with the structure which rotates with the support.

According to another characteristic of the invention, the support comprises an arm mounted to pivot about an axis of said structure, a cradle, and deformable elastic means located between the pivoting arm and the cradle, the elastic means being respectively attached to the pivoting arms and to the cradle.

According to another characteristic of the invention, the cradle comprises a central section having a generally U-shape with wings spreading apart from one another, the shape of the structure being positioned in such a way that the wings will be turned towards the pivoting arm.

According to another characteristic of the invention, the simulator comprises control means for an alarm system which is adapted to be set in motion by a critical oscillation of the cradle.

BRIEF DESCRIPTION OF THE DRAWINGS

The above and other characteristics and advantages of the present invention will appear throughout the following description, given in regard to the annexed drawings which are illustrative but not limiting, in which.

DETAILED DESCRIPTION OF THE DRAWINGS

Figure 1:
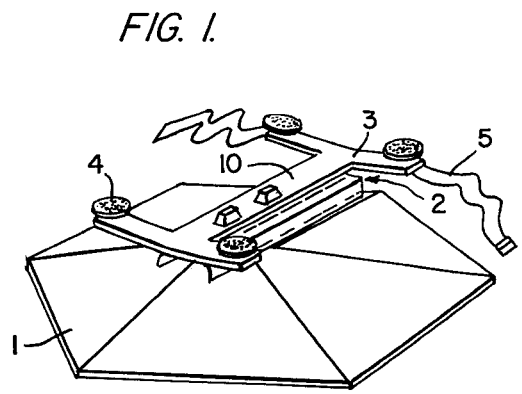
FIG. 1 is a perspective view of a wind surfing simulator.

The aggregate of FIGS. 1-13 represent the same basic device in accord with the invention, either as a whole or in section. In order to best understand the structure and functioning of the simulator, similar reference numerals have been provided to designate similar elements.

More specifically, FIG. 1 represents, in perspective, an advantageous embodiment of a simulator which essentially comprises a foundation 1 on which a pivoting arm 2 is rotatably mounted. A cradle 3 is mounted on the pivoting arm by means of deformable elastic supports. The cradle comprises a structural element 10 supporting two arms at the end of which four suction cups 4 are located; these suction cups permit the centering and support of a wind surfer.

The arms of cradle 3 support straps 5 to permit a suitable connection of a wind surfer to the cradle.

Figure 2:
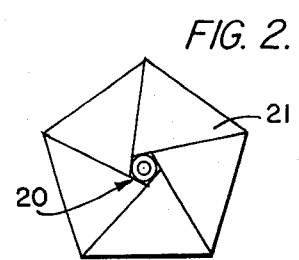
FIG. 2 is a top view of one embodiment of the foundation of the simulator.
Figure 3:
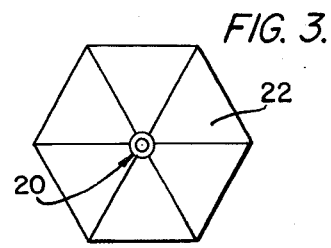
FIG. 3 is a top view of another embodiment of the foundation of the wind surfing simulator.

FIGS. 2 and 3 essentially show foundation 1 in two advantageous embodiments. FIG. 2 is a top view of the foundation, which comprises a plurality of webbed elements 21 tangentially connected to an axis of a pivot or shaft 20.

Figure 4:
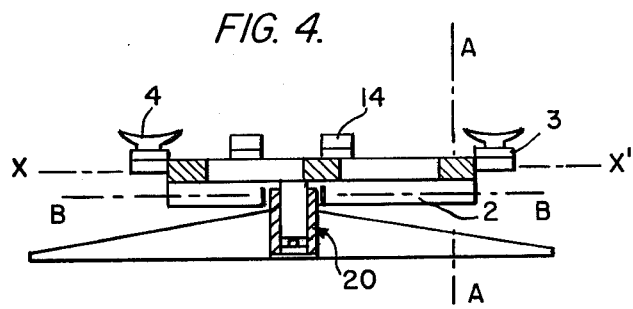
FIG. 4 is a cross-sectional view of the simulator of FIG. 1.

However, in the embodiment of the invention illustrated in FIG. 3, the plurality of elements 22 are radially connected to the pivoting axis or shaft 20. FIG. 4 represents, together with FIGS. 5 and 6, three cross-sections of the simulator of FIG. 1.

Shaft 20 is rotatably mounted on foundation 1, and is held gripped in the foundation when the foundation is being erected, regardless of whether the elements are in a tangential or a radial configuration.

Advantageously, shaft 20 comprises a rotating axis 30 which is mounted on platform 32 by a ball bearing, which is schematically illustrated at 33.

Pivoting arm 2 is mounted on an axis 30, the arm being integrally attached to axis 30 by any conventional means, preferably being bolted thereto.

Figure 7:
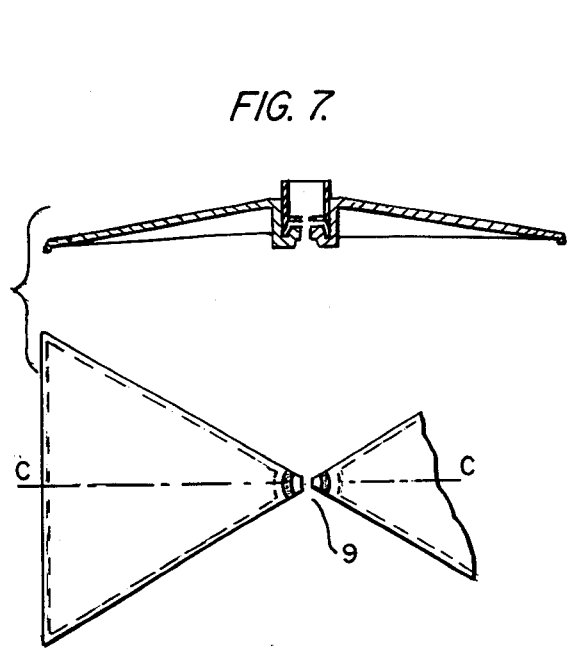
FIG. 7 is an exploded view of the foundation of the simulator.
Figure 8:
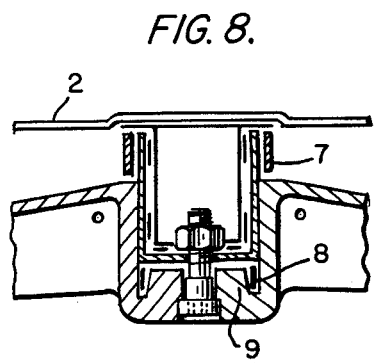
FIG. 8 is a cross-sectional view of the shaft of the foundation of the simulator.

A more detailed embodiment of the combination of axis 30 with platform 32 and ball bearings 33 appears more clearly in FIGS. 7 and 8, which show the various component elements of shaft 20, namely platform 32, which is gripped during erection of the various foundation elements 22 as seen in FIG. 3.

The various foundation elements are held by return ring 8, which slightly grips conical catches 9, the catches being integral with each component element of foundation 1.

Figure 6:
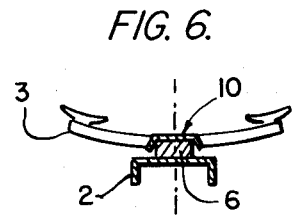
FIG. 6 is a cross-sectional view of the simulator of FIG. 4, taken along line A—A of FIG. 4.
Figure 5:
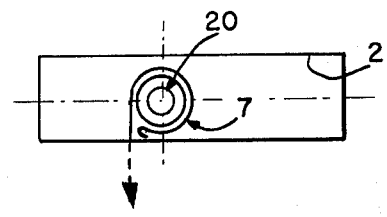
FIG. 5 is a top cross-sectional view of the simulator of FIG. 4, taken along line B—B of FIG. 4.

As seen in FIGS. 4–6, particularly, the simulator also comprises deformable elastic elements 6 which are integrally connected to pivoting arm 2 by any known means.

Advantageously, the pivoting arm has an oblong shape and comprises three deformable elastic elements 6 which are spread along the length of the arm in such a way that they define a position the length of which is greater than the width, the aggregate of the elastic elements defining a relatively long longitudinal direction with respect to the relatively short transverse direction which, as explained hereinafter, reconstruct through their deformation the two essential elements of a wind surfer on water, i.e., the pitching and rolling of the wind surfer.

Cradle 3 is located on these three deformable elements and comprises a structural shape 10 essentially having the shape of a U with two lateral edges 35 and 36 which are turned inwardly towards pivoting arm 2.

The structural shape is attached to the side of the elastic elements 6 opposite to the side to which pivoting arm 2 is attached by any known means, e.g., screwing or gluing, which are well-known in the rubber cushion art.

Figure 9:
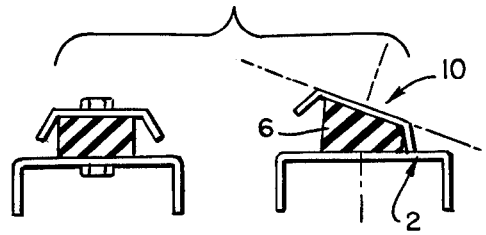
FIGS. 9 and 10 are sectional views of one embodiment of the pivoting arm of the simulator.
Figure 10:
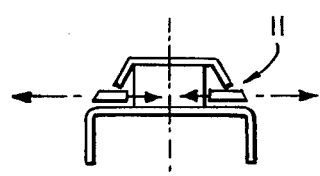

One embodiment of assembly 10 of pivoting arm 2, and of the deformable elastic elements, is more specifically illustrated in FIGS. 9 and 10. These figures show the relative movement of structural shape 10 with respect to pivoting arm 2, particularly during motion of the board which corresponds to rolling of a wind surfer.

It should be understood that lateral edges 35 and 36 of structural shape 10 permit the shape, during excessive rolling, in contact pivoting arm 2 and to thereby limit oscillation of the structure to enhance safety of a student. Block chocks 11, detailed hereinafter, can be positioned between pivoting arm 2 and lateral edges 35 and 36.

Lateral arms 37 and 38, components of cradle 3, are located slightly perpendicular to structural shape 10 at its two ends, and are symmetric with respect to the structural shape.

Four gripping suction cups are respectively located at the ends of arms 37 and 38, on which wind surfers can be supported.

Figure 11:
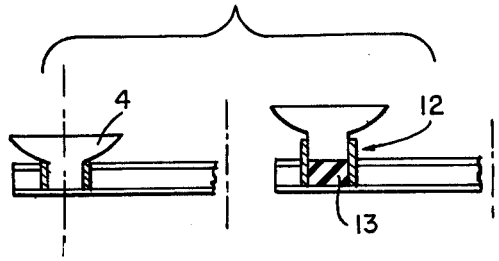
FIG. 11 is a sectional view of one embodiment of the cradle of the simulator.
Figure 12:
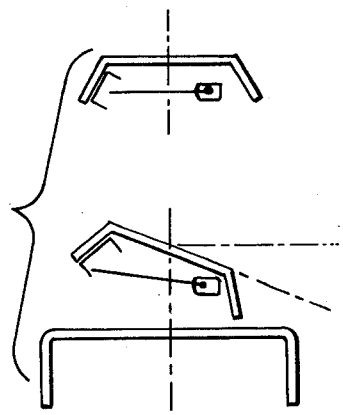
FIG. 12 is a front schematic view of an alarm system attached to the simulator.

One example of an embodiment of the suction cups is illustrated in FIG. 11, which illustrates suction cups being made of a deformable yet fairly rigid material. The suction cups comprise gripping head 39, on which base 40 is located, the base cooperating with attachment housings located in arms 37 and 38.

The height of suction cups 4 can be adjusted by inserting sleeve 12 between base 40 and arms 37 and 38. Chocks 13 can be inserted into the bottom of sleeve 12.

Moreover, cradle 3 comprises centering chocks 14, e.g., two chocks, which are designed to penetrate into the center board well 15 generally found on a wind surfer represented by P.

Figure 13:
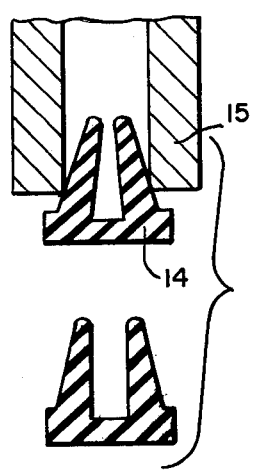
FIG. 13 is a front-sectional view disclosing the relationship of the centering chocks of the simulator to the center board well of a wind surfer.

The chocks are advantageously movable in the event that a wind surfer does not have a center board well conforming to the respective positioning of the centering chocks 14, as it appears in FIG. 1, and is it is schematically represented in FIG. 13.

The simulator can advantageously comprise, as shown in FIG. 10, block chocks 11 which can be inserted between wings 35 and 36 of structural shape 10 and pivoting arm 2 in order to stop, e.g., oscillations corresponding to rolling, and even, if the block chocks are all located along the length of pivoting arm 2 and structural shape 10, a second oscillation corresponding to pitching.

Under natural conditions, the use of a wind surfer presents several difficulties for students during sudden movements which surpass certain permitted limits and which would lead to a fall if the board were in its natural condition.

In order to facilitate warning a student, the simulator can comprise an alarm system 50, as schematically represented in FIG. 19. This system can comprise, schematically, a contactor 51 having an arm 52 which cooperates with fixed stops 53 and 54 of structural shape 10, and with wing 35.

During operation of the simulator, if oscillations of structural shape 10 are too great in one direction or the other, stops 54 and 55 will cooperate with arm 52 of contactor 51 and will set in motion either an audio or visual alarm.

Figure 14:
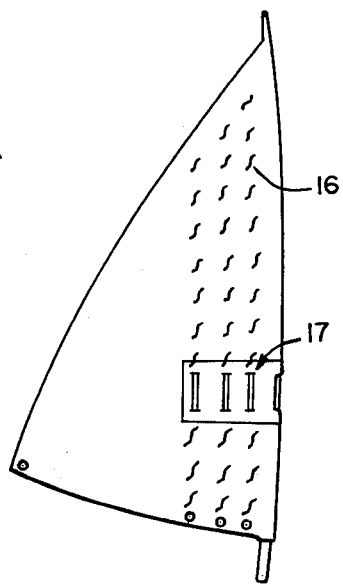
FIGS. 14 and 15 are side views of wind surfer sails.
Figure 15:
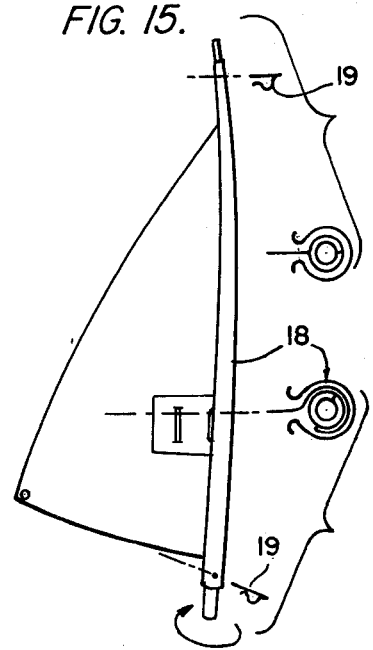

Advantageously, when a wind surfer is used on such a simulator, a sail can be used as illustrated in FIGS. 14 and 15, which represents an advantageous means for adjusting and eventually storing the sail.

More specifically, the reduction of the sail by reef bands 16, as well as the attachment and adjustment of a wishbone, occurs by passing the end of the sails through slit 17, the reduction of the wind surfer sail occuring essentially by wrapping it around the mass and inside of the split section 18, bolted by key 19, as shown in FIG. 15.

The simulator as represented in the Figures thus permits use of the wind surfer for training.

As previously described, elastic means 6 permit the production of two essential movements of a wind surfer on water, i.e., pitching and rolling motions. Moreover, the simulator permits the wind surfer to move in a desired direction.

The direction is obtained on the simulator by pivoting arm 2 integrally with axis 30 and with respect to foundation 1 by platform 32 and ball bearings 33.

It is evident that rotation of the pivoting arm will not be freer than necessary, and can even be completely restrained in certain cases.

In order to so restrain the arm, the simulator comprises, as seen in FIG. 5, a braking system 6 comprising a brake fitting, e.g., strip 7, with an end which is attached at 61 to one side of pivoting arm 2. The other end of strip 7, after surrounding shaft 20 and platform 32, which is stationary with respect to foundation 1, is attached to tension means schematically represented by reference numberal 63; accordingly, exertion of traction on end 62 will generally tighten the fitting strip, which due to such tightening, will in turn exert a desired friction on platform 32 of shaft 20.

For training purposes, the traction can be adjusted so that the pivoting arm is stationary with respect to foundation 1.

The simulator described above essentially functions as follows when it is used for training.

A conventional wind surfer is positioned on cradle 3 so that its center board well will fit exactly onto the two centering chocks 14 and so that its bottom will be positioned and centered on suction cups 4.

Once the board is positioned, it is stabilized or cradled by straps 5.

The sail with its mast is positioned in conventional fashion on relatively rigid ground, which can even constitute sand, due to the sufficiently large area covered by foundation 1.

Thus prepared, a student can mount the wind surfer and manipulate the wind surfer by exerting himself as a function of blowing wind, and the student can orient the board as if he were navigating on the ocean.

According to the various manipulations and orientations of the wind, the wind surfer board will undergo all types of movements which essentially comprise a pitching movement, if oscillation occurs around an axis perpendicular to the alignment of the three elastic elements 6, a rolling movement, if oscillation occurs about a longitudinal axis defined by the three elastic elements and, finally, a pivoting movement via rotation about platform 32, by means of axis 30 and ball bearings 33. The last, rotating movement, can be braked by means of the braking fitting which will be tightened to a necessary degree by acting on tightener 63.

Of course, the safety of the device, namely the oscillation amplitude corresponding to rolling, will be limited by wings 35 and 36; and, obviously, if the simulator includes an alarm system, the system will function when too large of an amplitude occurs.

Finally, in a schematic fashion, if too violent of a wind occurs, the sail will be reduced by wrapping itself about the axis.

The simulator example described above corresponds to the present invention, but it is evident that one of skill in the art could change the means described by using equivalent means while still remaining within the scope of the present invention.

I claim:

1. A simulator for a wind surfer adapted to be placed on a variety of surfaces comprising:
    (a) a foundation comprising at least one webbed element;
    (b) means for supporting a wind surfer;
    (c) means for pivotably connecting said foundation and said supporting means;
    (d) means for braking pivotal movement of said supporting means; and
    (e) means for longitudinally and transversely oscillating said supporting means with respect to said foundation.

2. The simulator according to claim 1 wherein said foundation comprises a plurality of webbed elements.

3. The simulator according to claim 2 wherein said plurality of webbed elements are connected by a ring, said ring being centrally disposed within said foundation.

4. The simulator according to claim 3, wherein said plurality of webbed elements are tangentially connected to said ring.

5. The simulator according to claim 3 wherein said webbed elements are radially connected to said ring.

6. The simulator according to claim 1 wherein said means for braking the pivoting movement of said supporting means is adpated to frictionally engage said support means.

7. The simulator according to claim 1, wherein said supporting means comprises an arm pivotably mounted to an axis of said foundation, a cradle, and deformable elastic means located between said arm and said cradle, said elastic means being connected, respectively, to said pivoting arm and said cradle.

8. The simulator according to claim 7 wherein said supporting means further comprises means for limiting the agitation of said cradle in relation to said pivoting arm, said limiting means comprising chocks.

9. The simulator according to claim 7 further comprising an alarm system, said alarm system comprising means for monitoring the oscillation of said cradle in relation to said pivoting arm, said monitoring means comprising stops which cooperate with an arm of an alarm contactor.

10. The simulator according to claim 7 wherein said cradle comprises at least one gripping means for holding said wind surfer.

11. The simulator according to claim 10 wherein said gripping means comprises suction cups located on said support.

12. The simulator according to claim 10 wherein said cradle further comprises means for positioning said wind surfer on said cradle, said positioning means comprising centering chocks.

13. The simulator according to claim 1 further comprising a sail and means for reducing the size of said sail by wrapping said sail around a sail axis.

* * * * *